United States Patent
Kiplinger et al.

(10) Patent No.: US 7,258,063 B2
(45) Date of Patent: Aug. 21, 2007

(54) BARBEQUE GRILLING BAG

(76) Inventors: Gail Kiplinger, 4520 - 45th Ct., Sarasota, FL (US) 34234; Jason Kiplinger, 4520 - 45th Ct., Sarasota, FL (US) 34234

( * ) Notice: Subject to any disclaimer, the term of this patent is extended or adjusted under 35 U.S.C. 154(b) by 0 days.

(21) Appl. No.: 10/956,937

(22) Filed: Oct. 1, 2004

(65) Prior Publication Data
US 2006/0070531 A1   Apr. 6, 2006

(51) Int. Cl.
*A47J 37/00* (2006.01)
(52) U.S. Cl. .......................................... 99/426; 99/450
(58) Field of Classification Search .......... 99/444–450, 99/426, 400, 401, 394, 340, 419–421 V; 383/8, 117, 76, 77
See application file for complete search history.

(56) References Cited

U.S. PATENT DOCUMENTS

| 895,657 | A | * | 8/1908 | Moll | 99/450 |
| 1,814,378 | A | * | 7/1931 | Gilbertson et al. | 383/117 |
| 1,915,196 | A | * | 6/1933 | McGuire | 220/489 |
| 2,973,218 | A | * | 2/1961 | Schaum | 294/142 |
| 4,203,479 | A | * | 5/1980 | Mathews | 383/95 |
| 4,630,312 | A | * | 12/1986 | Milstein | 383/86 |

* cited by examiner

*Primary Examiner*—Timothy F. Simone
(74) *Attorney, Agent, or Firm*—Larson & Larson; Herbert W. Larson

(57) ABSTRACT

A body portion constructed of loosely interlocked solid metal interconnected members assembled adjacent to each other to form a receptacle. A top layer of the interconnected members is supported by a pair of wire frame members pivotably engaged at opposite ends to provide a way to open and close the body portion. An inverted U-shaped handle is attached to each frame member and each is offset from each other to close the body portion and each is disengaged to open the body portion.

12 Claims, 3 Drawing Sheets

BARBEQUE GRILLING BAG

BACKGROUND OF THE INVENTION

1. Field of the Invention

The invention relates to metal bags employed for barbequing food. More particularly it refers to a metal linked barbeque bag having a quick release locking mechanism.

2. Description of the Prior Art

A meat broiler made from interlinked metal rings is shown in U.S. Pat. No. 895,657 and an interlinked metallic laundry bag is shown in U.S. Pat. Nos. 1,814,378 and 1,915,196. The prior art, however, does not suggest how vegetables and smaller cuts of meat or fish can be cooked on a grill in a convenient fashion. A metallic bag that can be opened and closed quickly to grill small food items is needed for the greatly expanding outdoor grill market.

SUMMARY OF THE INVENTION

The present invention solves this problem by providing a barbeque grilling bag having a pair of top wire frame members hinged together by end loops and supporting a bag of multiple solid metal interconnected members held together by three or more small split clamps attached to adjacent solid metal interconnected members. The frame members each have an upright inverted U-shaped handle or closing member offset from each other. By inserting one closing member behind the other the bag is closed, but is quickly opened to disgorge the grilled bag contents merely by disengaging the closing members.

BRIEF DESCRIPTION OF THE DRAWINGS

The invention can be best understood by those having ordinary skill in the art by reference to the following detailed description when considered in conjunction with the accompanying drawings in which.

DETAILED BEST MODE DESCRIPTION

Figure 1:
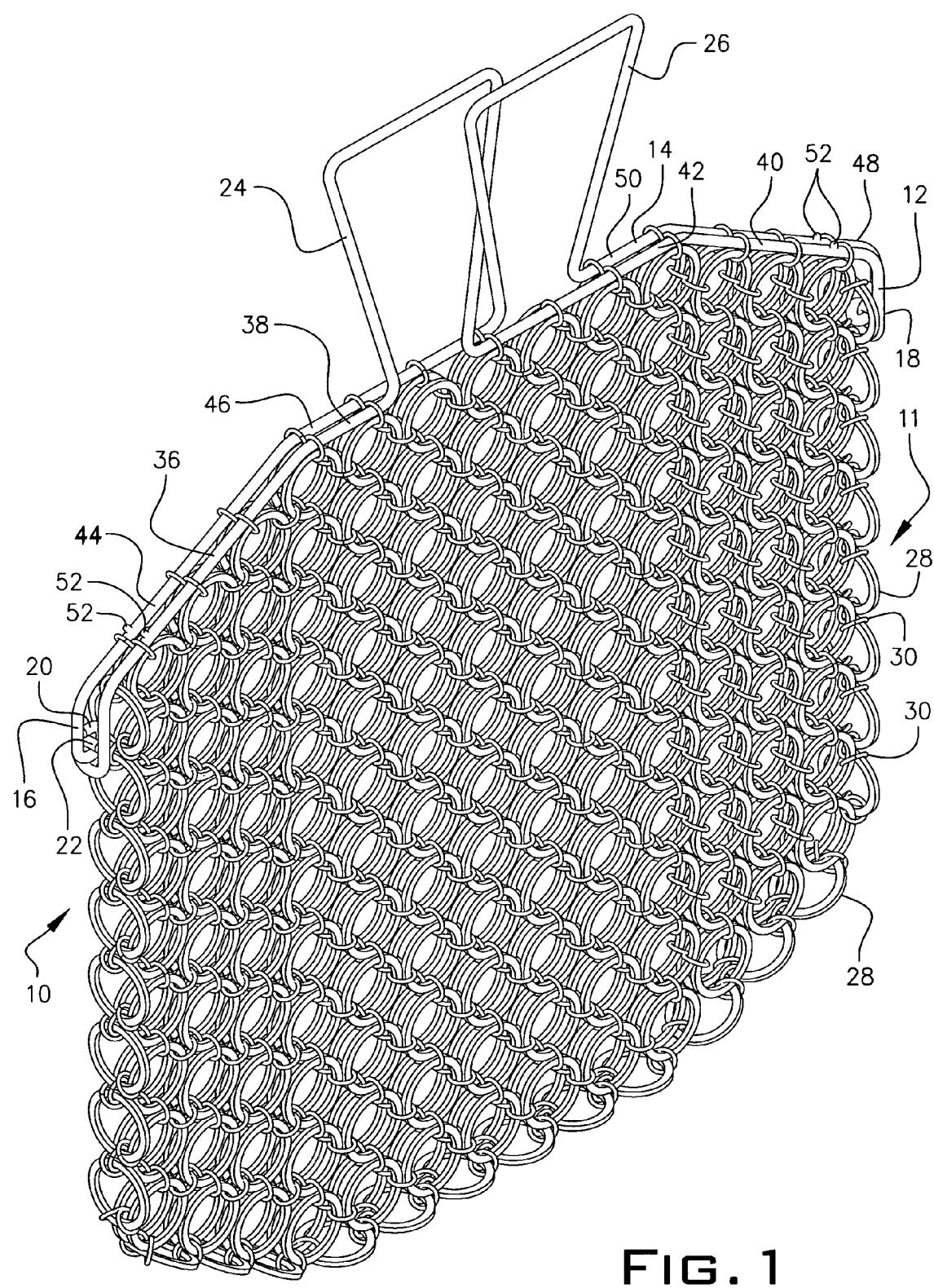
FIG. 1 is a perspective view of the barbeque grilling bag displayed upright in a closed configuration.

Throughout the following detailed description, the same reference numerals refer to the same elements in all figures.

Figure 2:
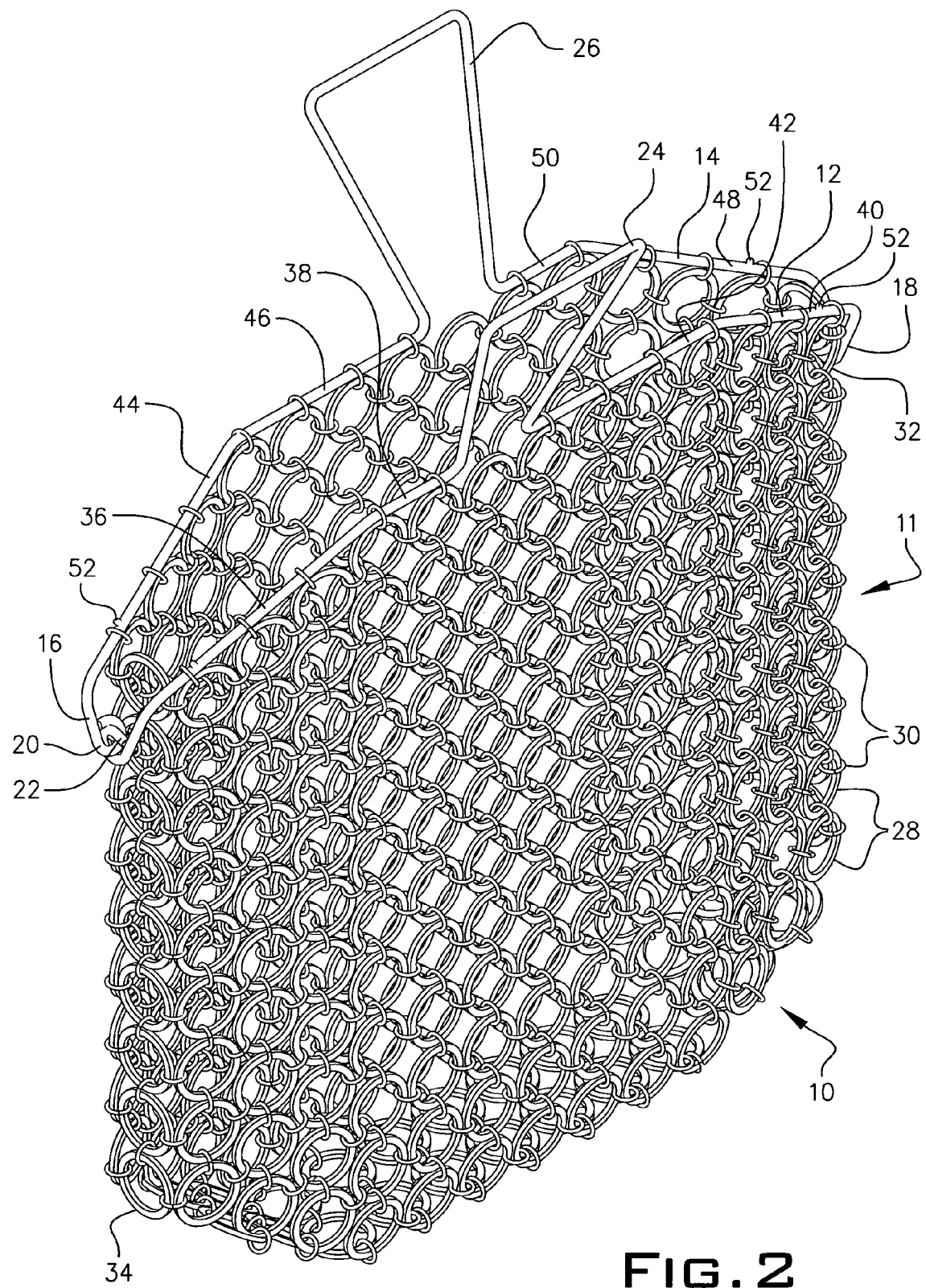
FIG. 2 is a perspective view of the barbeque grilling bag shown in FIG. 1 in an open configuration.

Referring to FIGS. 1 and 2, the barbeque grilling bag 10 has a first 12 and second 14 frame member pivotably engaged at a first end 16 and a second end 18. Each end of the first 12 and second 14 frame member is bent in a loop 20 or 22 and are engaged together to form the pivotal mechanism for opening or closing the bag 10. Frame member 12 has an upwardly directed inverted U-shaped portion 24 and frame member 14 also has an upwardly directed inverted U-shaped portion 26. Each U-shaped portion 24 and 26 is slightly offset with respect to each other so that U-shaped portion 24 is engaged behind U-shaped portion 26 to close the grilling bag 10.

Depending from frame members 12 and 14 is bag 11 composed of multiple solid metal interconnected members 28. The preferred interconnected member is a ring but other shapes such as ovals or triangles could be employed. Each ring 28 is assembled side by side and top to bottom with an adjacent ring 28 by multiple metal clasps 30. These clasps 30 are smaller split rings that are closed over adjacent rings 28. Generally, four clasps 30 are assembled on each ring 28 so that the top, bottom, right side and left side of each ring 28 is juxtaposed to an adjacent ring 28. Rings adjacent the frames 12 and 14 at ends 16 and 18 have five clasps 30. Bottom rings 34 have only three clasps 30.

Each frame member 12 and 14 has a horizontal portion on each side of the U-shaped portion 24 and 26, respectively. On frame member 12, descending portion 36 forms an obtuse angle with horizontal portion 38. On the other side of handle 24, descending portion 40 forms an obtuse angle with horizontal portion 42. On frame 12, horizontal portion 38 is shorter than horizontal portion 42. On frame member 14, descending portion 44 forms an obtuse angle with horizontal portion 46. On the other side of handle 26, descending portion 48 forms an obtuse angle with horizontal portion 50. On frame member 14, horizontal portion 50 is shorter than horizontal portion 46 so that the handles 24 and 26 are slightly offset from one another. As seen in FIG. 1 handle 24 is engaged behind handle 26 to close bag 11. Nubs 52 are positioned on frames 12 and 14 above the placement of the last clamp 30 to force the last clamp 30 to remain near the end of the descending portions 36, 40, 44 and 48. These nubs 52 help the bag 11 retain its proper shape.

Figure 3:
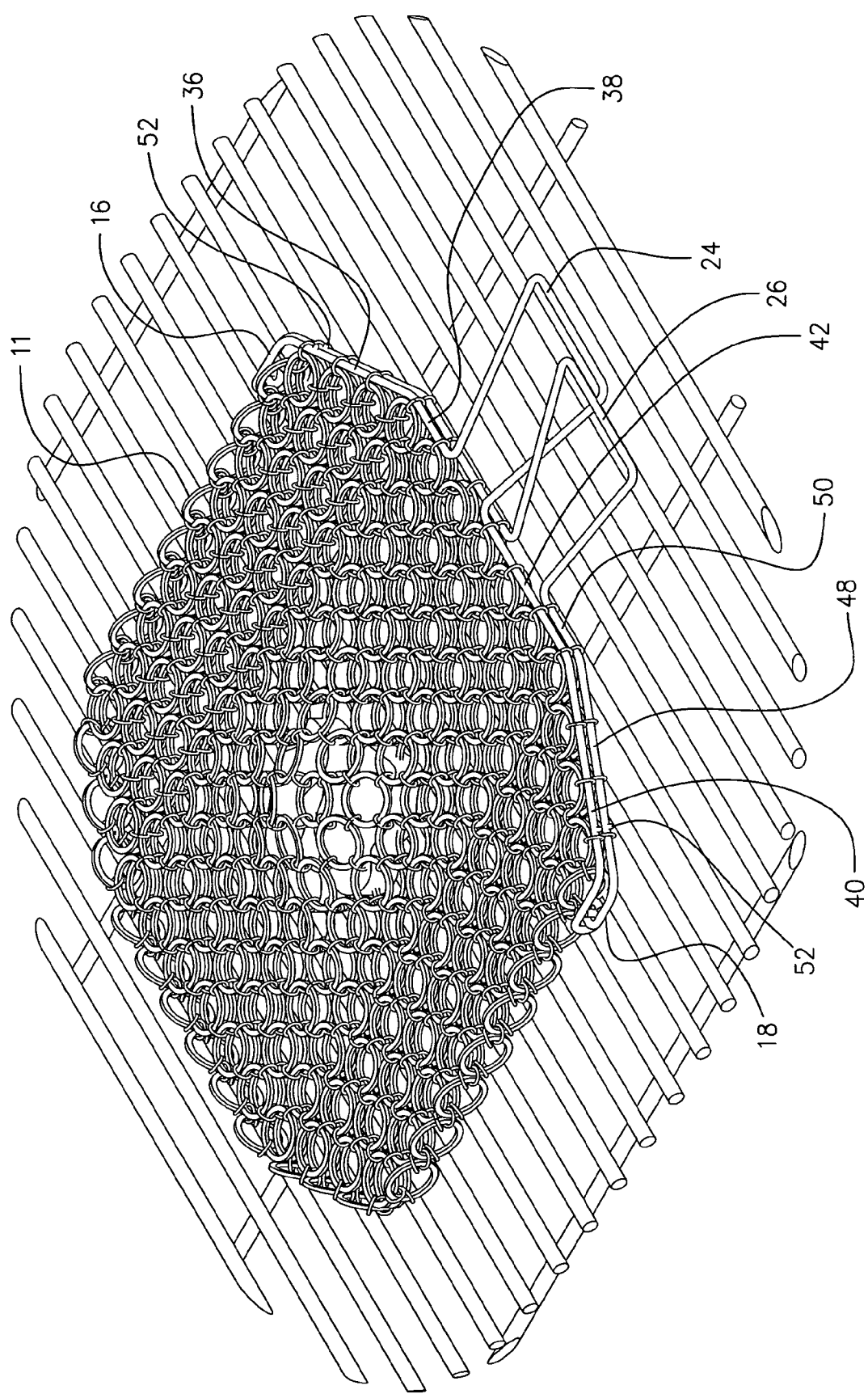
FIG. 3 is a perspective view of the barbeque grilling bag of this invention in a closed configuration laid out on a barbeque grill.

Vegetables and small cuts of meat are placed within bag 11 and grilled as shown in FIG. 3. When the grilling is completed, the handles 24 and 26 are disengaged by pushing them apart laterally to open bag 11 and retrieve the cooked vegetables and meat.

Before cooking with the grill bag, the barbeque grill is preheated in the usual manner. Pieces of food are placed inside the grill bag and the handles are locked together. The food pieces include any combination of meats, vegetables, or fruit and can be optionally marinated before placing them in the bag. Because the grill bag is completely independent of the grill, food items may be prepared and placed in the bag at a different location and then carried to the grill. The entire grill bag is placed on the hot grilling surface. The holes in the bag allow the food to come in direct contact with the heat source thus absorbing the aromas associated with barbeque cooking. During cooking, additional sauces and seasonings can be poured or sprinkled directly on the bag. The holes in the bag allow the food to absorb the seasonings. As the food cooks, a set of standard tongs is used to lift the bag up and move it into different positions. Because the bag is flexible, it can be flipped over, stood up on one end, or made to take on different shapes to move the contents around. The user can push on the bag with tongs to circulate the food pieces and ensure even cooking. The holes in the bag are small enough that food pieces do not fall out as they are shifted. As meat cooks, grease that is produced will fall through the holes in the bag thus creating a healthier meal. Tongs can be used to lift up a corner of the bag so that the user can peek underneath and see the progress of the cooking. Because the entire bag fits on the cooking surface, the lid can be closed during cooking in order to steam the contents. The handles can be opened during cooking and more food can be added, allowing food that cook in different times to be prepared together. The bag can be stood up on one end and placed on the edge of the grilling surface to keep its contents warm while allowing other larger food items to be cooked over the flames. When cooking is complete, tongs are used to lift the bag off the grilling surface and the bag can be carried to another location. The bag is allowed to cool for a few moments and when the handles are cool to the touch, they are unlocked and the food is poured onto a serving platter.

The bag can be manufactured in a variety of sizes. A set of small bags can be used to facilitate a party theme where each guest chooses their own contents. Medium and large sized bags can be used to create side dishes or entrees for any sized gathering.

Equivalent elements can be substituted for the elements set forth herein to provide substantially the same results in substantially the same way.

Having thus described the invention what is claimed and desired to be secured by Letters Patent is:

1. A barbeque grilling bag comprising:
    a body constructed of loosely engaged solid metal interconnected members, the interconnected members assembled side by side and top to bottom with metal clasps, each interconnected member joined to an adjacent interconnected member or a first and second metal frame by at least three of the metal clasps;
    the first and second metal frames adapted to support the body in a vertical plane when the first and second metal frames are lifted uprightly;
    the first and second metal frames each having a horizontal portion on each side of an upright integral handle and a continuous descending portion distal from the handle, the descending portion terminating in a means for pivotably joining together the first and second metal frames to permit opening of the body; and
    the handles offset with respect to each other so that the body is closed by placing one handle behind the other handle.

2. The barbeque grilling bag according to claim 1, wherein substantially all the interconnected members are rings.

3. The barbeque grilling bag according to claim 2, wherein substantially all the solid metal rings have four clasps joining one solid metal ring to an adjacent ring depending from the first and second metal frame.

4. The barbeque grilling bag according to claim 2, wherein a nub is positioned inboard and adjacent a last clamp juxtaposed to each end of the continuous descending portion of the first and second metal frame.

5. The barbeque grilling bag according to claim 1, wherein the means for pivotably joining together the first and second metal frames is a loop at an end of the descending portion distal from the handle at each side of the first and second metal frame, the loops from adjacent ends of the first and second metal framed engaged together.

6. The barbeque grilling bag according to claim 1, wherein the descending portion of the first and second frame forms an obtuse angle with respect to the horizontal portion.

7. The barbeque grilling bag according to claim 1, wherein each handle is a substantially U-shaped inverted upright extension from each horizontal portion of the first and second metal frames.

8. The barbeque grilling bag according to claim 7, wherein the handle in the first metal frame is offset from the handle in the second metal frame.

9. A barbecue grilling receptacle comprising:
    a body constructed of loosely assembled solid metal rings, the rings assembled together with smaller metal split rings, a top layer of solid metal rings attached to a first and second metal wire supporting the body in a vertical plane when the first and second metal wires are lifted uprightly;
    the first metal wire having a substantially upright portion, a horizontal portion on each side of the upright portion, a descending portion from each horizontal portion ending in a loop and the second metal wire having a substantially upright portion, a horizontal portion on each side of the upright portion, a descending portion from each horizontal portion ending in a loop and the loop at each end of the first and second metal wires pivotably engaged together wherein the upright portion of the first and second wire is substantially in the shape of an inverted U to form a handle and closing member, wherein the handles on the first and second metal wires are offset from each other so that one can be engaged behind the other to close the receptacle.

10. The barbeque grilling receptacle according to claim 9, wherein the descending portion of the first and second metal wires form an obtuse angle with respect to the horizontal portion.

11. The barbeque grilling receptacle according to claim 9, wherein a nub is positioned inboard and adjacent a last split ring juxtaposed to each end of the continuous descending portion of the first and second metal frame.

12. The barbeque grilling receptacle according to claim 9, filled with vegetables, fruit or meat.

* * * * *